US012658034B2

(12) United States Patent
Azizbaigi et al.

(10) Patent No.: US 12,658,034 B2
(45) Date of Patent: Jun. 16, 2026

(54) SYSTEMS AND METHODS FOR ESTIMATING VEHICLE TRAFFIC VOLUME

(71) Applicant: Geotab Inc., Oakville (CA)

(72) Inventors: Kasra Azizbaigi, Toronto (CA); Natalie Joy Smith, Oakville (CA); Chien An Liu, Toronto (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/285,598

(22) Filed: Jul. 30, 2025

(65) Prior Publication Data

US 2026/0038367 A1 Feb. 5, 2026

Related U.S. Application Data

(60) Provisional application No. 63/677,681, filed on Jul. 31, 2024.

(51) Int. Cl.
*G08G 1/01* (2006.01)

(52) U.S. Cl.
CPC ......... *G08G 1/0137* (2013.01); *G08G 1/0125* (2013.01)

(58) Field of Classification Search
CPC ........................... G08G 1/0137; G08G 1/0125
See application file for complete search history.

(56) References Cited

U.S. PATENT DOCUMENTS 7,440,842 B1 10/2008 Vorona
7,613,564 B2 11/2009 Vorona
(Continued)

FOREIGN PATENT DOCUMENTS

CN 106846805 A * 6/2017 ............ G06Q 10/04
CN 108682156 A 10/2018
(Continued)

OTHER PUBLICATIONS

U.S. Department of Transportation Federal Highway Administration Office of Highway Information Management, Traffic Monitoring Guide 3rd Edition, USDT, FHWA-PL-95-031 pp. 4-1-1, 4-1-2, 2-2-2, 5-2-2, (Year: 1995).*
(Continued)

*Primary Examiner* — Aniss Chad
*Assistant Examiner* — Chase L Cooley
(74) *Attorney, Agent, or Firm* — Gabriel F. Rogers

(57) ABSTRACT

Disclosed herein are systems and methods for determining an expansion factor for estimating vehicle traffic. One example method comprises operating at least one processor to: receive telematics data originating from a plurality of telematics devices installed in a plurality of vehicles, map data and census data related to an area within which the vehicles operate; determine, using the telematics data and the map data, an initial estimated vehicle traffic volume for a road segment along which the vehicles operate based on an amount of the vehicles that operate therealong; generate a total estimated vehicle traffic volume for each of the road segments by inputting into a machine learning model the initial estimated vehicle traffic volume and the census data; and determine the expansion factor for the road segments based at least in part on a ratio of the initial estimated vehicle traffic volume to the total estimated vehicle traffic volume.

15 Claims, 4 Drawing Sheets

(56) References Cited

U.S. PATENT DOCUMENTS

| | | | | |
|---|---|---|---|---|
| 8,805,610 | B2 * | 8/2014 | Bagheri | G08G 1/0129 701/117 |
| 8,825,356 | B2 | 9/2014 | Vorona | |
| 9,286,795 | B2 | 3/2016 | Vorona | |
| 9,361,800 | B2 | 6/2016 | Vorona | |
| 9,773,410 | B2 | 9/2017 | Vorona | |
| 2008/0027772 | A1 * | 1/2008 | Gernega | G06Q 10/04 705/7.26 |
| 2017/0309171 | A1 * | 10/2017 | Zhao | G08G 1/096838 |
| 2018/0299559 | A1 | 10/2018 | Zhao et al. | |

FOREIGN PATENT DOCUMENTS

| | | | |
|---|---|---|---|
| CN | 113256968 | A | 8/2021 |
| CN | 114724414 | A | 7/2022 |
| CN | 116071912 | A | 5/2023 |
| KR | 20180042714 | A | 4/2018 |

OTHER PUBLICATIONS

Extended European Search Report for European Application No. 25191132.7, mailed Dec. 11, 2025, 108 pages.

* cited by examiner

SYSTEMS AND METHODS FOR ESTIMATING VEHICLE TRAFFIC VOLUME

CROSS-REFERENCE TO RELATED APPLICATIONS

This application claims priority to and the benefit of U.S. Patent Application Ser. No. 63/677,681, filed on Jul. 31, 2024, which is hereby incorporated by reference in its entirety.

TECHNICAL FIELD

The present disclosure generally relates to traffic volume estimation using telematics data. More specifically, the present disclosure relates to the determination of expansion factors for traffic volume estimation.

BACKGROUND

Today, many vehicles rely on computer-based systems (e.g., one or more processors) for their operation. As will be appreciated, such systems manage and/or produce many types of data associated with various aspects of the vehicle during the operation thereof that may generally be referred to as "telematics data". As will be described herein, telematics data may include any information, parameters, attributes, characteristics, and/or features associated with the vehicle and may be obtained therefrom using, for example, a telematics device.

The telematics data may be used by users such as fleet managers to gain insights into a fleet of vehicles (e.g., maintenance information, safety information, sustainability information, and the like. As well, certain types of the telematics data may be used by a telematics information provider (e.g., the telematics device provider) to provide broader or generalized information, based on the telematics data of a plurality of users. One example is traffic volume estimation, which generally refers to the practice of estimating traffic volumes based on a subset of that traffic.

As will be appreciated, traffic volume estimations may be useful for a variety of applications such as but not limited to traffic planning, logistic operation decisions, and the like. However, conventional techniques for traffic volume estimation may be inaccurate and/or may not be possible for certain locations, both of which issues may be due at least in part to the availability of comprehensive traffic data. For example, conventional techniques for traffic volume estimation may be based on data provided the US Federal Highway Administration (FHWA), which provides traffic monitoring data collected from about 3000 discrete locations across the US. Thus, while traffic volume estimations may be accurate for those discrete locations, the traffic volume estimates may not be particularly accurate for other locations and/or may lack the granularity (e.g., generalized traffic volume estimates for relatively large areas as well as relatively small areas without locations providing traffic monitoring data) desired by a user.

A need therefore exists for improved systems and methods for estimating traffic volume.

SUMMARY

In one aspect, the present disclosure relates to a system for determining an expansion factor for estimating vehicle traffic volume, the system comprising: at least one data storage operable to store telematics data originating from a plurality of telematics devices installed in a plurality of vehicles, map data and census data related to an area within which the plurality of vehicles operate; and at least one processor, the at least one processor operable to: determine, using the telematics data and the map data, an initial estimated vehicle traffic volume for each of a plurality of road segments along which the plurality of vehicles operate based on an amount of the plurality of vehicles that operate therealong; generate a total estimated vehicle traffic volume for each of the plurality of road segments along which the plurality of vehicles operate by inputting into a machine learning model the initial estimated vehicle traffic volume for each thereof and the census data; and determine the expansion factor for each of the plurality of road segments along which the plurality of vehicles operate based at least in part on a ratio of the initial estimated vehicle traffic volume thereof to the total estimated vehicle traffic volume.

According to an embodiment, the at least one processor is operable to determine the expansion factor for each of the plurality of road segments by applying a linear regression model to the initial estimated vehicle traffic volume and the total estimated traffic volume of each of the plurality of road segments.

According to a further embodiment, the at least one processor is operable to determine one or more aggregate expansion factors for a selected area, the one or more aggregate expansion factors based at least in part on a ratio of the initial estimated vehicle traffic volume of one or more of the plurality of road segments located within the selected area to the total estimated vehicle traffic volume of the one or more road segments located within the selected area.

According to a further embodiment, the at least one processor is operable to determine the aggregate expansion factors based at least in part on a ratio of a weighted average of the initial estimated vehicle traffic volume of the one or more of the plurality of road segments located within the selected area divided by the length of each thereof to a weighted average of the total estimated vehicle traffic volume of the one or more road segments located within the selected area divided by the length of each thereof.

According to a further embodiment, the selected area is a country, a state, a province, a county, a census tract, or a combination thereof.

According to a further embodiment, the at least one processor is further operable to determine one or more vehicle-based expansion factors for a selected area, the vehicle-based expansion factors based at least in part on a portion of the census data indicating an amount of commercial traffic present in the selected area.

According to a further embodiment, the at least one processor is operable to determine the one or more vehicle-based expansion factors by: determining an initial percentage of commercial traffic for one or more of the plurality of road segments located within the selected area based on the initial estimated traffic volume of each thereof and the portion of the census data indicating the amount of commercial traffic present in the selected area; determining a total percentage of commercial traffic for each of the plurality of road segments based on the total estimated traffic volume of each thereof and the portion of the census data indicating the amount of commercial traffic present in the selected area; and determining the one or more vehicle-based expansion factors based on a ratio of the initial percentage of commercial traffic in the selected area to the total percentage of commercial traffic in the selected area.

According to a further embodiment, the selected area is a country, a state, a province, a county, a census tract, or a combination thereof.

According to a further embodiment, the census data comprises geospatial data, demographic data, economic data, transportation data, or a combination thereof.

According to a further embodiment, the census data comprises income data, population data, gross domestic product (GDP) data, business and firm data, or a combination thereof.

According to a further embodiment, the plurality of vehicles are commercial vehicles.

According to a further embodiment, the machine learning model comprises a neural network model, a regression model, a random forest model, a gradient boosting model, or a combination thereof.

According to a further embodiment, the plurality of road segments comprise motorways, trunk roads, primary roads, secondary roads, tertiary roads, or a combination thereof.

In another aspect, the present disclosure relates to a method for determining an expansion factor for estimating vehicle traffic volume, the method comprising operating at least one processor to: receive telematics data originating from a plurality of telematics devices installed in a plurality of vehicles, map data and census data related to an area within which the plurality of vehicles operate; determine, using the telematics data and the map data, an initial estimated vehicle traffic volume for each of a plurality of road segments along which the plurality of vehicles operate based on an amount of the plurality of vehicles that operate therealong; generate a total estimated vehicle traffic volume for each of the plurality of road segments along which the plurality of vehicles operate by inputting into a machine learning model the initial estimated vehicle traffic volume for each thereof and the census data; and determine the expansion factor for each of the plurality of road segments along which the plurality of vehicles operate based at least in part on a ratio of the initial estimated vehicle traffic volume thereof to the total estimated vehicle traffic volume.

According to an embodiment, the determining of the expansion factor for each of the plurality of road segments comprises operating the at least one processor to apply a linear regression model to the initial estimated vehicle traffic volume and the total estimated traffic volume of each of the plurality of road segments.

According to a further embodiment, the method further comprises operating the at least one processor to determine one or more aggregate expansion factors for a selected area, the one or more aggregate expansion factors based at least in part on a ratio of the initial estimated vehicle traffic volume of one or more of the plurality of road segments located within the selected area to the total estimated vehicle traffic volume of the one or more road segments located within the selected area.

According to a further embodiment, the determining of the one or more aggregate expansion factors is based at least in part on a ratio of a weighted average of the initial estimated vehicle traffic volume of the one or more of the plurality of road segments located within the selected area divided by the length of each thereof to a weighted average of the total estimated vehicle traffic volume of the one or more road segments located within the selected area divided by the length of each thereof.

According to a further embodiment, the selected area is a country, a state, a province, a county, a census tract, or a combination thereof.

According to a further embodiment, the method further comprises operating the at least one processor to determine one or more vehicle-based expansion factors for a selected area, the vehicle-based expansion factors based at least in part on a portion of the census data indicating an amount of commercial traffic present in the selected area.

According to a further embodiment, the determining of the one or more vehicle-based expansion factors comprises operating the at least one processor to: determine an initial percentage of commercial traffic for one or more of the plurality of road segments located within the selected area based on the initial estimated traffic volume of each thereof and the portion of the census data indicating the amount of commercial traffic present in the selected area; determine a total percentage of commercial traffic for each of the plurality of road segments based on the total estimated traffic volume of each thereof and the portion of the census data indicating the amount of commercial traffic present in the selected area; and determine the one or more vehicle-based expansion factors based on a ratio of the initial percentage of commercial traffic in the selected area to the total percentage of commercial traffic in the selected area.

According to a further embodiment, the selected area is a country, a state, a province, a county, a census tract, or a combination thereof.

According to a further embodiment, the census data comprises geospatial data, demographic data, economic data, transportation data, or a combination thereof.

According to a further embodiment, the census data comprises income data, population data, gross domestic product (GDP) data, business and firm data, or a combination thereof.

According to a further embodiment, the plurality of vehicles are commercial vehicles.

According to a further embodiment, the machine learning model comprises a neural network model, a regression model, a random forest model, a gradient boosting model, or a combination thereof.

According to a further embodiment, the plurality of road segments comprise motorways, trunk roads, primary roads, secondary roads, tertiary roads, or a combination thereof.

In another aspect, the present disclosure relates to a non-transitory computer-readable medium having instructions stored thereon executable by at least one processor to implement the methods described herein.

Other aspects and features of the systems and methods of the present disclosure will become apparent to those ordinarily skilled in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Figure 1:
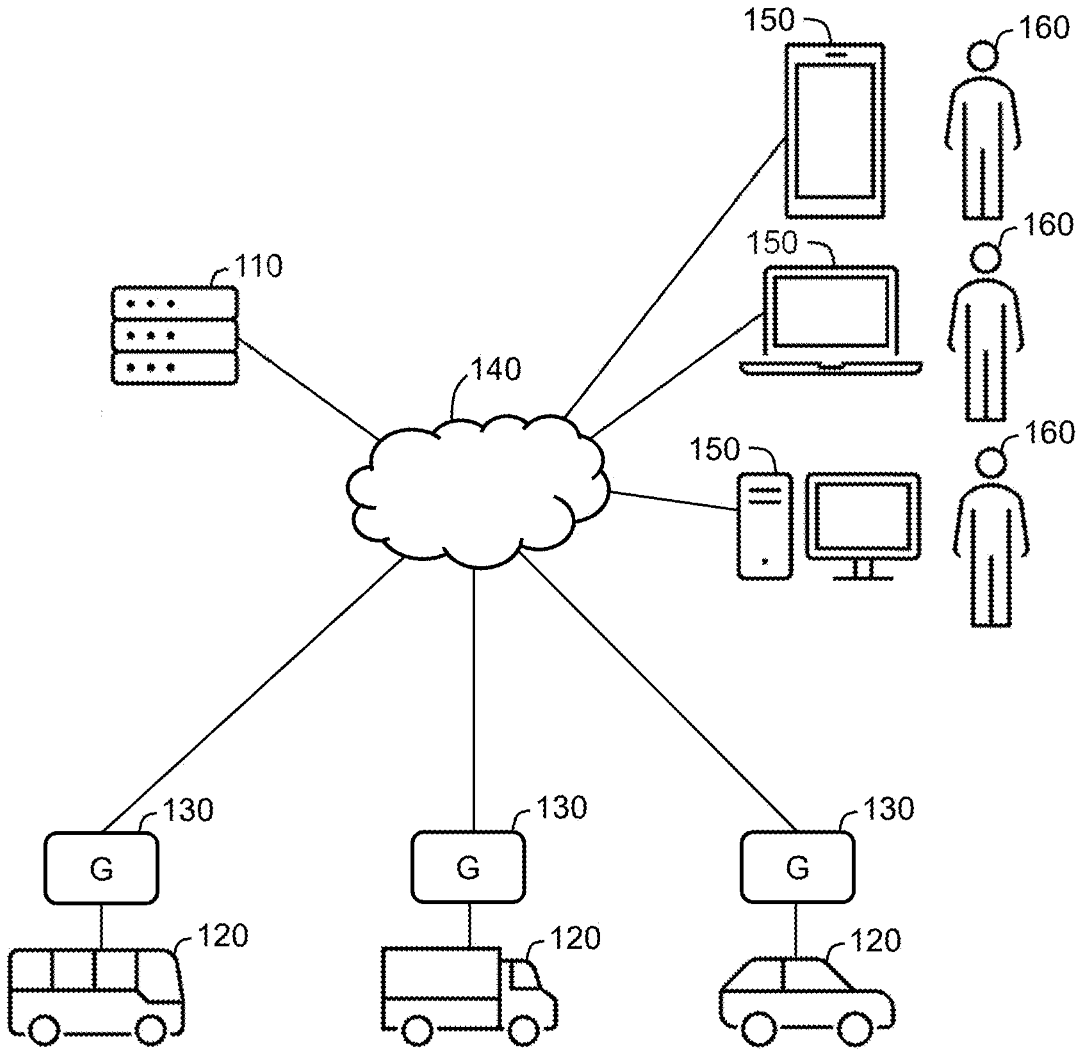
FIG. 1 is a block diagram of various components interacting with an example fleet management system according to an embodiment of the present disclosure.

Traffic volume estimation has a number of applications across a variety of industries. For example, traffic volume estimates may be used by logistic companies when planning routes. In that example, it will be appreciated that in some circumstances it may be beneficial to plan a route that avoids areas that experience a particularly high volume of traffic—e.g., to mitigate safety risks, to maintain trip efficiencies, etc. As another example, traffic planning agencies (e.g., government agencies) often use traffic volume estimates to design infrastructure for efficient management of traffic volume. In such cases, the accuracy of the traffic volume estimates is particularly important, as the construction of appropriate infrastructure for traffic management may be a long, complex, and expensive process.

However, while traffic volume estimates have a variety of useful applications, conventional techniques for traffic volume estimation may have a number of shortcomings. In more detail, such conventional techniques may produce traffic volume estimates that are inaccurate, or in some case, may not be useable for areas lacking traffic monitoring data. As described herein, conventional techniques for traffic volume estimation may be based on data provided by government agencies such as the US Federal Highway Administration (FHWA), which provides traffic monitoring data collected from about 3000 discrete locations across the US. As a result, conventional traffic volume estimations may be accurate for those discrete locations while not being particularly accurate for other locations. As well, conventional traffic volume estimations may not have the granularity desired by a user due to, for example, traffic volume estimates having to be generalized for areas that lack locations providing traffic monitoring data, which, in countries such as the US and Canada, may be large in size.

It is therefore an object of the present disclosure to provide advantageous systems and methods for estimating traffic volume.

For example, in some embodiments, the systems and methods of the present disclosure may not rely on traffic monitoring data collected and distributed by government agencies. As described above, such data may be limited to use at the discrete location from which the data was collected. Instead, the systems and methods of the present disclosure may leverage multiple types of data to estimate traffic volume to provide more accurate traffic volume estimates than the conventional techniques. In more detail, the systems and methods of the present disclosure may generally use at least telematics data and census data to estimate traffic volumes in an area. The telematics data may generally indicate the number of vehicles, the types of vehicles, the roadways used by the vehicles, and the like in a given area, at a given time, etc. The census data may generally describe various aspects of the area or areas in which the vehicles operate and may include information such as economic information, population information, etc. As will be described herein, the telematics data and the census data may be used together to provide traffic volume estimations for an area regardless of whether traffic monitoring data is available for that area.

Further, because the systems and methods of the present disclosure are not limited to data provided by a limited number of discrete locations that obtain and distribute traffic monitoring data, the systems and methods are capable of estimating traffic volumes for areas of different sizes and, as indicated above, those without a location that collects traffic monitoring data. That is, the systems and methods of the present disclosure may estimate traffic volume at varying levels of granularity. As will be described herein, using the systems and methods described herein, traffic volume estimates may be generated for road segments (i.e., for individual roads or portions thereof), for census tracts, counties, states/provinces, countries, etc. In contrast, conventional techniques for estimating traffic volumes are restricted to locations that collect traffic monitoring data and may not be capable of more granular traffic volume estimations.

Additional advantages will be discussed below and will be readily apparent to those of ordinary skill in the art upon reading the present disclosure.

Reference will now be made in detail to example embodiments of the disclosure, wherein numerals refer to like components, examples of which are illustrated in the accompanying drawings that further show example embodiments, without limitation.

Referring now to FIG. 1, there is shown an example of a fleet management system 110 for managing a plurality of assets equipped with a plurality of telematics devices 130. Each of the telematics devices 130 is capable of collecting various data from the vehicles 120 (i.e., telematics data) and sharing the telematics data with the fleet management system 110. The fleet management system 110 may be remotely located from the telematics devices 130 and the vehicles 120.

The vehicles 120 may include any type of vehicle. For example, the vehicles 120 may include motor vehicles such as cars, trucks (e.g., pickup trucks, heavy-duty trucks such as class-8 vehicles, etc.), motorcycles, industrial vehicles (e.g., buses), and the like. Each motor vehicle may be a gas, diesel, electric, hybrid, and/or alternative fuel vehicle. Further, the vehicles 120 may include vehicles such as railed vehicles (e.g., trains, trams, and streetcars), watercraft (e.g., ships and recreational pleasure craft), aircraft (e.g., airplanes and helicopters), spacecraft, and the like. Each of the vehicles 120 may be equipped with one of the telematics devices 130.

Further, it is noted that, while only three vehicles 120 having three telematics devices 130 are shown in the illustrated example, it will be appreciated that there may be any number of vehicles 120 and telematics devices 130. For example, the fleet management system 110 may manage hundreds, thousands, or even millions of vehicles 120 and telematics devices 130.

In some embodiments, the telematics devices 130 may be standalone devices that are removably installed in the vehicles 120 (e.g., aftermarket telematics devices). In other embodiments, the telematics devices 130 may be integrated components of the vehicles 120 (e.g., pre-installed by an OEM). As described herein, the telematics devices 130 may collect various telematics data and share the telematics data with the fleet management system 110. The telematics data may include any information, parameters, attributes, characteristics, and/or features associated with the vehicles 120. For example, the vehicle data may include, but is not limited to, location data, speed data, acceleration data, fluid level data (e.g., oil, coolant, and washer fluid), energy data (e.g., battery and/or fuel level), engine data, brake data, transmission data, odometer data, vehicle identifying data, error/diagnostic data, tire pressure data, seatbelt data, airbag data, or a combination thereof. In some embodiments, the telematics data may include information relating to the telematics devices 130 and/or other devices associated with or connected to the telematics devices 130. Regardless, it should be appreciated the telematics data is a form of electronic data that requires a computer (e.g., a processor such as those described herein) to transmit, receive, interpret, process, and/or store.

Once received, the fleet management system 110 may process the telematics data obtained from the telematics devices 130 to provide various analysis, predictions, reporting, etc. In some embodiments, the fleet management system 110 may process the telematics data to provide additional information about the vehicles 120, such as, but not limited to, trip distances and times, idling times, harsh braking and driving, usage rates, fuel economy, and the like. Various data analytics may be implemented to process the telematics data. The telematics data may then be used to manage various aspects of the vehicles 120, such as route planning, vehicle maintenance, driver compliance, asset utilization, fuel management, etc., which, in turn, may improve productivity, efficiency, safety, and/or sustainability of the vehicles 120.

A plurality of computing devices 150 may provide access to the fleet management system 110 to a plurality of users 160. The users 160 may use computing devices 150 to access or retrieve various telematics data collected and/or processed by the fleet management system 110 to manage and track the vehicles 120. As will be appreciated, the computing devices 150 may be any suitable computing devices. For example, the computing devices 150 may be any type of computers such as, but not limited to, personal computers, portable computers, wearable computers, workstations, desktops, laptops, smartphones, tablets, smartwatches, personal digital assistants (PDAs), mobile devices, and the like. The computing devices 150 may be remotely located from the fleet management system 110, telematic devices 130, and vehicles 120.

The fleet management system 110, telematics devices 130, and computing devices 150 may communicate through a network 140. The network 140 may comprise a plurality of networks and may be wireless, wired, or a combination thereof. As will be appreciated, the network 140 may employ any suitable communication protocol and may use any suitable communication medium. For example, the network 140 may comprise Wi-Fi™ networks, Ethernet networks, Bluetooth™ networks, near-field communication (NFC) networks, radio networks, cellular networks, and/or satellite networks. The network 140 may be public, private, or a combination thereof. For example, the network 140 may comprise local area networks (LANs), wide area networks (WANs), the internet, or a combination thereof. Of course, as will also be appreciated, the network 140 may also facilitate communication with other devices and/or systems that are not shown.

Further, the fleet management system 110 may be implemented using one or more computers. For example, the fleet management system 110 may be implements using one or more computer servers. The servers may be distributed across a wide geographical area. In some embodiments, the fleet management system 110 may be implemented using a cloud computing platform, such as Google Cloud Platform™ and Amazon Web Services™. In other embodiments, the fleet management system 110 may be implemented using one or more dedicated computer servers. In a further embodiment, the fleet management system 110 may be implemented using a combination of a cloud computing platform and one or more dedicated computer servers.

Figure 2:
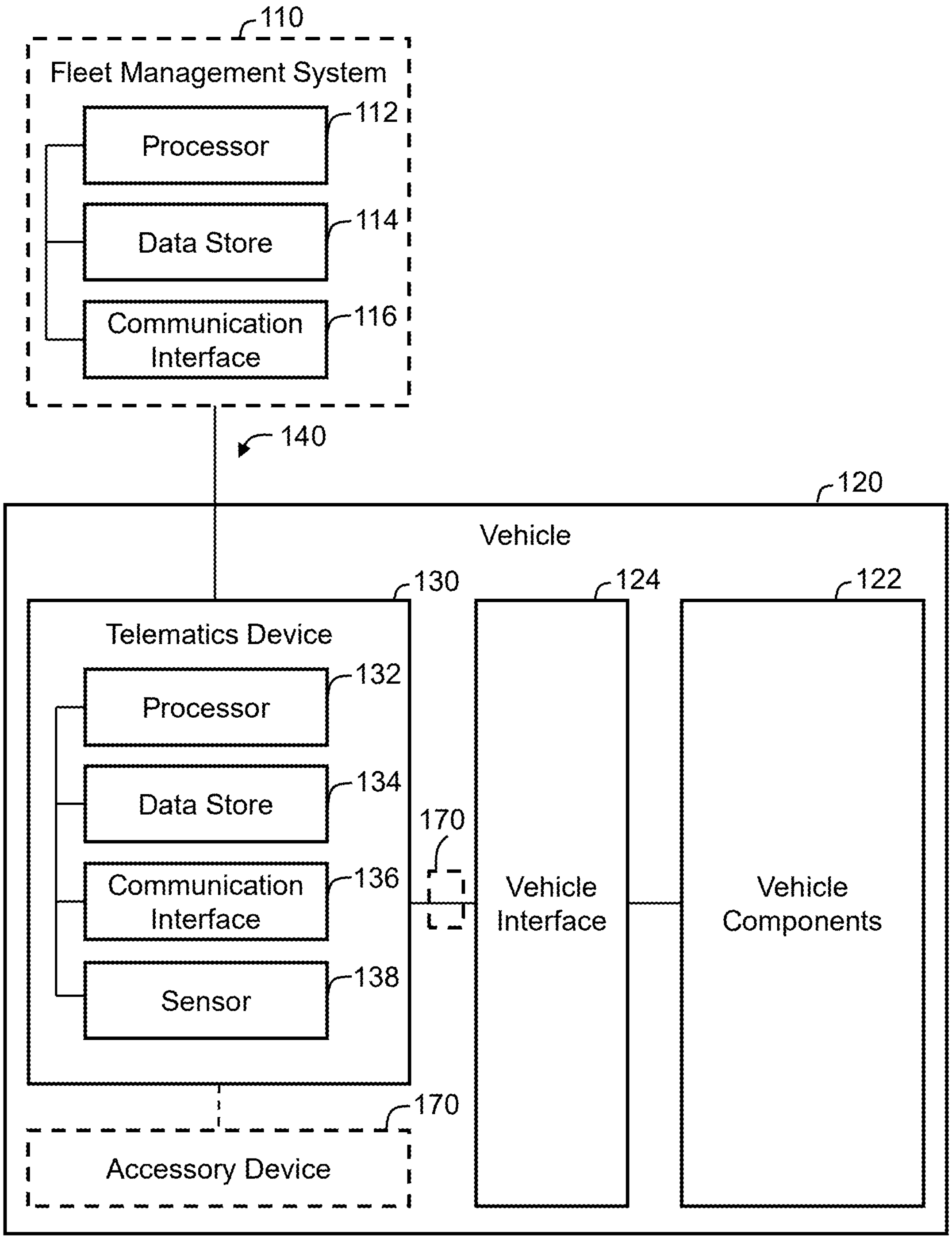
FIG. 2 is a block diagram of an example fleet management system interacting with an example telematics device and an example vehicle, according to an embodiment of the present disclosure.

Referring now to FIG. 2, there is illustrated the fleet management system 110 in communication with one of the telematics devices 130 that is installed in one of the vehicles 120. As shown, the fleet management system 110 may include a processor 112, a data storage 114, and a communication interface 116, each of which may communicate with each other. The processor 112, the data storage 114, and the communication interface 116 may be combined into fewer components, divided into additional subcomponents, or a combination thereof. The components and/or subcomponents may not necessarily be distributed in proximity to one another and may instead be distributed across a wide geographical area.

The processor 112 may control the operation of the fleet management system 110. As will be appreciated, the processor 112 may be implemented using one or more suitable processing devices or systems. For example, the processor 112 may be implemented using central processing units (CPUs), graphics processing units (GPUs), field programmable gate arrays (FPGAs), application specific integrated circuits (ASICs), digital signal processors (DSPs), neural processing units (NPUs), quantum processing units (QPUs), microprocessors, controllers, and the like. The processor 112 may execute various instructions, programs, software, or a combination thereof stored on the data storage 114 to implement various methods described herein. For example, the processor 112 may process various telematics data collected by the fleet management system 110 from the telematics devices 130.

Various data for the fleet management system 110 may be stored on the data storage 114. The data storage 114 may be implemented using one or more suitable data storage devices or systems such as random-access memory (RAM), read only memory (ROM), flash memory, hard disk drives (HDDs), solid-state drives (SSDs), magnetic tape drives, optical disc drives, memory cards, and the like. The data storage 114 may include volatile memory, non-volatile memory, or a combination thereof. Further, the data storage 114 may comprise non-transitory computer readable media. The data storage 114 may store various instructions, programs, and/or software that are executable by the processor 112 to implement various methods described herein. The data storage 114 may store various telematics data collected from the telematics devices 130 and/or processed by the processor 112.

The communication interface 116 may enable communication between the fleet management system 110 and other devices and/or systems, such as the telematics devices 130. The communication interface 116 may be implemented using any suitable communications devices and/or systems. For example, the communication interface 116 may comprise one or more various physical connectors, ports, or terminals such as universal serial bus (USB), ethernet, Thunderbolt, Firewire, serial advanced technology attachment (SATA), peripheral component interconnect (PCI), high-definition multimedia interface (HDMI), DisplayPort, and the like. As another example, the communication interface 116 may comprise one or more wireless interface components to connect to wireless networks such as Wi-Fi™, Bluetooth™, NFC, cellular, satellite, and the like. The communication interface 116 may enable various inputs and outputs to be received at and sent from the fleet management system 110. For example, the communication interface 116 may be used to telematics data from the telematics devices 130.

The telematics devices 130 also may include a processor 134, a data storage 134, and a communication interface 136. The telematics devices 130 may also comprise a sensor 138. Each of the components of the telematics devices 130 may communicate with each other and may be combined into fewer components or divided into additional subcomponents.

The processor 132 may control the operation of the telematics device 130. The processor 132 may be implemented using any suitable processing devices or systems, such as those described above in relation to the processor 112 of the fleet management system 110. The processor 132 may execute various instructions, programs, software, or a combination thereof stored on the data storage 134 to implement various methods described herein. For example, the processor 132 may process various telematics data obtained from vehicle components 122 and/or the sensor 138.

The data storage 134 may store various data for the telematics device 130. The data storage 134 may be any suitable data storage device or system, such as those described above in relation to the data storage 114 of the fleet management system 110. The data storage 134 may store various instructions, programs, software, or a combination thereof executable by the processor 132 to implement various methods described herein. As well, the data storage 134 may store various telematics data obtained from the vehicle components 122 and/or the sensor 138.

The communication interface 136 may enable communication between the telematics devices 130 and other devices or systems, such as the fleet management system 110 and the vehicle components 122. The communication interface 136 may comprise any suitable communication devices or systems, such as those described above in relation to the communication interface 116 of the fleet management system 110. The communication interface 136 may enable various inputs and outputs to be received at and sent from the telematics devices 130. For example, the communication interface 136 may be used to collect vehicle data from the vehicle components 122 and/or sensor 138, to send vehicle data to the fleet management system 110, etc.

The sensor 138 may detect and/or measure various environmental events, changes, etc. The sensor 138 may include any suitable sensing devices or systems, such as, but not limited to, location sensors, velocity sensors, acceleration sensors, orientation sensors, vibration sensors, proximity sensors, temperature sensors, humidity sensors, pressure sensors, optical sensors, audio sensors, and combinations thereof. When the telematics device 130 is installed in the vehicle 120, the sensor 138 may be used to collect telematics data that may not be obtainable from the vehicle components 122. For example, the sensor 138 may include a satellite navigation device such as a global positioning system (GPS) receiver that may measure the location of the vehicle 120. In some embodiments, the sensor 138 may comprise accelerometers, gyroscopes, magnetometers, inertial measurement units (IMUs), or the like that may measure the acceleration and/or orientation of the vehicle 120.

In some embodiments, the telematics devices 130 may operate in conjunction with one or more accessory devices 170 that are in communication therewith. The accessory devices 170 may include one or more expansion devices that may provide additional functionality to the telematics devices 130. For example, the accessory devices 170 may provide additional processing storage, communication, and/or sensing functionality through one or more additional processors, data storages, communication interfaces, and/or sensors (not pictured). The accessory devices 170 may also include adaptor devices that facilitate communication between the communication interface 136 and one or more vehicle interfaces 124, such as a cable harness. The one or more accessory devices 170 may be installed in the vehicle 120 along with the telematics devices 130.

As described herein, the telematics device 130 may be installed within the vehicle 120 removably or integrally. The vehicle 120 may include the vehicle components 122 and the one or more vehicle interfaces 124, which, as will be appreciated, may be combined into fewer components or divided into additional subcomponents. In some embodiments, the vehicle components 122 may comprise any subsystems, parts, subcomponents, or combinations thereof of the vehicle 120. For example, the vehicle components 122 may comprise powertrains, engines, transmissions, steering, braking, seating, batteries, doors, suspensions, etc. The telematics device 130 may obtain various telematics data from the vehicle components 122. For example, in some embodiments, the telematics device 130 may communicate with one or more electrical control units (ECUs) that control the vehicle components 122 or one or more internal sensors thereof.

The vehicle interface 124 may facilitate communication between the vehicle components 122 and other devices or systems. As well, the vehicle interface 124 may comprise any suitable communication devices or systems. For example, the vehicle interface 124 may include an on-board diagnostics (OBD-II) port and/or controller area network (CAN) bus port. The vehicle interface 124 may be used by the telematics device 130 to obtain telematics data from the vehicle components 122. For example, the communication interface 136 may be connected to the vehicle interface 124 to communicate with the vehicle components 122. In some embodiments, the one or more accessory devices 170 (e.g., a wire harness) may provide the connection between the communication interface 136 and the vehicle interface 124.

Figure 3:
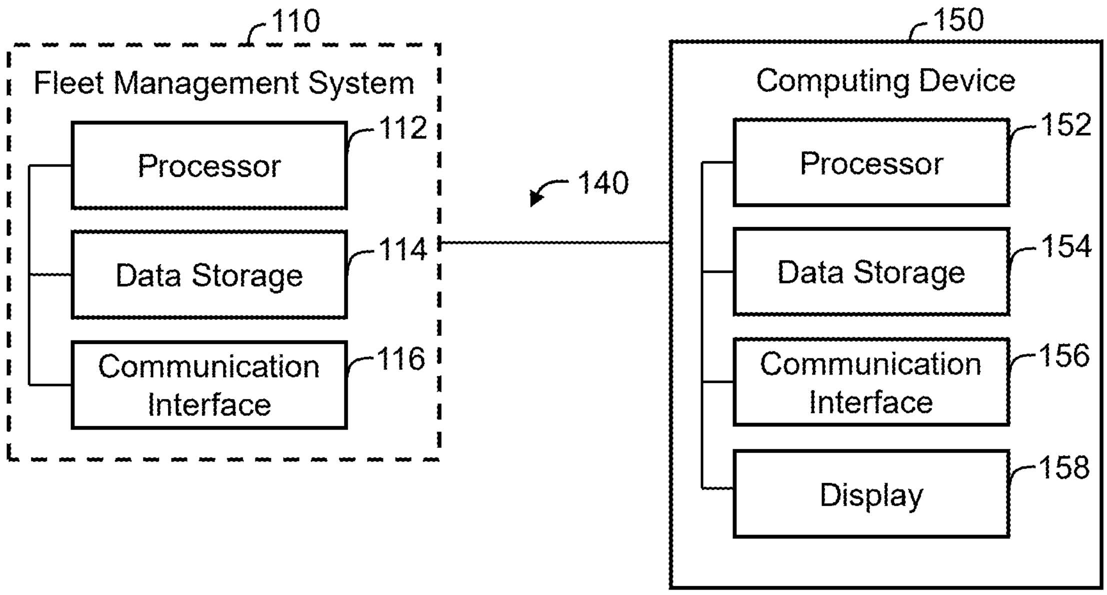
FIG. 3 is a block diagram of an example computing device interacting with an example fleet management system, according to an embodiment of the present disclosure.

Referring now to FIG. 3, there is shown the fleet management system 110 in communication with the computing devices 150. As shown, the computing device 150 may also include a processor 152, a data storage 153, and a communication interface 156. As well, the computing device 150 may include a display 158. Each of the components of the computing device 150 may be communicate with each other and may be combined into fewer components or divided into additional subcomponents.

The processor 152 may control the operation of the computing device 150. The processor 152 may be implemented using any suitable processing devices or systems, such as those described above in relation to the processor 112 of the fleet management system 110. The processor 152 may execute various instructions, programs, software, or a combination thereof stored on the data storage 154 to implement various methods described herein. For example, the processor 152 may process various telematics data received from the fleet management system 110, the telematics devices 130, or a combination thereof.

The data storage 154 may store various data for the computing device 150. The data storage 150 may be any suitable data storage device or system, such as those described above in relation to the data storage 114 of the fleet management system 110. The data storage 154 may store various instructions, programs, software, or a combination thereof executable by the processor 152 to implement various methods described herein. As well, the data storage 154 may store various telematics data received from the fleet management system 110, the telematics devices 130, or a combination thereof.

The communication interface 156 may enable communication between the computing device 150 and other devices or systems, such as the fleet management system 110. The communication interface 156 may be any suitable communication device or system, such as those described above in relation to the communication interface 116 of the fleet management system 110. The communication interface 156 may enable various inputs and outputs to be received at and sent from the computing device 150. For example, the communication interface 156 may be used to retrieve telematics data the fleet management system 110.

The displays 158 may visually present various data for the computing device 150. The displays 158 may be implemented using any suitable display devices or systems, such as, but not limited to, light-emitting diode (LED) displays, liquid crystal displays (LCD), electroluminescent displays (ELDs), plasma displays, quantum dot displays, cathode ray tube (CRT) displays, and the like. The display 158 may be an integrated component that is integral with the computing device 150 or a standalone device that is removable connected to the computing device 150. The display 158 may display various visual representations of the telematics data.

Figure 4:
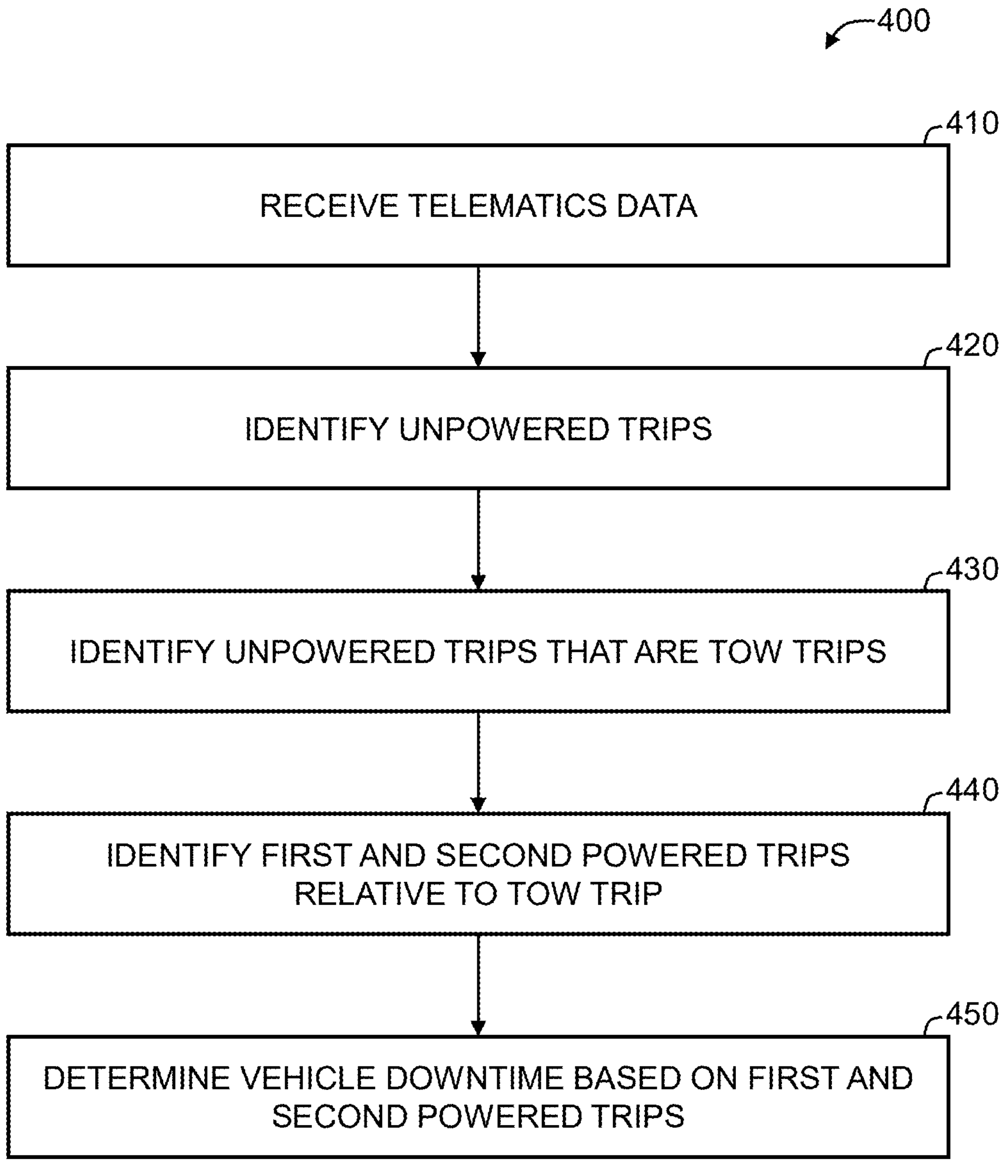
FIG. 4 is a flowchart of an example method for determining an expansion factor for estimating vehicle traffic volume, according to an embodiment of the present disclosure.

Referring now to FIG. 4, there is shown a method for determining an expansion factor for estimating vehicle traffic volume (400). As shown, the method 400 comprises operating at least one processor to: receive telematics data originating from a plurality of telematics devices installed in a plurality of vehicles, map data and census data, the map data and census data related to an area within with the plurality of vehicles operate (410); determine, using the telematics data and map data, an initial estimated vehicle traffic volume for each of a plurality of road segments along which the plurality of vehicles operate based on an amount of the plurality of vehicles that operate therealong (420); generate a total estimated vehicle traffic volume for each of the plurality of road segments along which the plurality of vehicles operate by inputting into a machine learning model the initial estimated vehicle traffic volume for each thereof and the census data (430); and determine the expansion factor for each of the plurality of road segments along which the plurality of vehicles operate based at least in part on a ratio of the initial estimated vehicle traffic volume thereof to the total estimated vehicle traffic volume (440).

Thus, the systems and methods of the present disclosure (e.g., the method 400) may generally involve the determination of an expansion factor that may, in turn, be used for vehicle traffic estimations. In more detail, an expansion factor is a factor that, when applied to a volume of traffic representing a subset or fraction of total traffic volume for a selected area (e.g., a road segment, a state, a province, a country, etc.), provides an estimate of the total vehicle traffic volume for that selected area. As will be described herein, using the systems and methods of the present disclosure, expansion factors may be determined for areas of different sizes (i.e., at varying granularity), road segments, and the like for estimating the total vehicle traffic volume thereof.

The method 400 may be implemented using any suitable combination of hardware and software, such as those described in reference to FIG. 1 to FIG. 3. For example, one or more operations (e.g., operations 410, 420, 430, and/or 440) of the method 400 may be implemented at the fleet management system (e.g., by the processor 112 executing instructions stored on the data storage 114), at the telematics device 130 (e.g., by the processor 132 executing instructions stored on the data storage 134), at the computing devices 150 (e.g., by the processor 152 executing instructions stored on the data storage 154), or a combination thereof.

At operation 400, telematics data originating from a plurality of telematics devices installed in a plurality of vehicles, map data, and census data, the map data and census data relating to an area within which the plurality of vehicles operate, may be received.

In more detail, the telematics data may be obtained from the plurality of vehicles using, for example, one or more of the systems outlined in FIG. 1 to FIG. 3. For example, the telematics device 130 (e.g., the processor 132) may receive telematics data from the sensor 138, vehicle components 122, or a combination thereof. Alternatively, or additionally, the fleet management system 110 (e.g., the processor 112) may receive telematics data from the telematics device 130. Additionally, or alternatively, the computing device 150 (e.g., the processor 152) may receive telematics data from the telematics device 130 and/or the fleet management system 110. Additionally, or alternatively, the telematics device 130, the fleet management system 110, and/or the computing device 150 may receive telematics data from one or more data storages (e.g., one or more of the data storages 114, 134, 154).

As described herein, the telematics data may be used in the systems and methods of the present disclosure for, for example, the determining an initial estimated vehicle traffic volume for each road segment that the vehicles from which the telematics data is obtained operate along. Thus, the telematics data may at least include data such as, but not limited to, geospatial data (e.g., GPS coordinates, trip information, speed data, etc.), vehicle identifying data (e.g., vehicle identification numbers, vehicle type, etc.).

In some embodiments, the telematics data may be preprocessed prior to and/or subsequently to being received. For example, the telematics data may be received in one or more various formats, standards, or protocols. In some cases, it may be beneficial to reformat the telematics data prior to use in the systems and methods of the present disclosure. As a further example, the telematics data may include datapoints reported at irregular frequencies and/or that correspond to mismatched points in time. In such cases, the telematics data may be interpolated so that the datapoints in each time series correspond to successive and/or equally spaced points in time. As a yet further example, and as will be described herein, the telematics data may be curve-logged telematics data, which may result in a reduced number of received datapoints. In such implementations, the reduced number of datapoints may be interpolated to provide a fulsome dataset.

As described above, the map data may be related to an area within which the plurality of vehicles operate. The map data may include information, parameters, attributes, characteristics, and/or features associated with a geographical area. For example, the map data may include information relating to the location, placement, size, shape, and/or design of infrastructure (e.g., road networks comprising road segments such as, but not limited to, roads, streets, highways, freeways, alleyways, motorways, motorways, trunk roads, primary roads, secondary roads, tertiary roads, etc.), topographical features (e.g., rivers, mountains, hills, greenways, etc.), regulatory features, (e.g., country borders, state or provincial borders, city limits, counties, neighbourhoods, etc.) or a combination thereof. The map data may be obtained from, for example, various map information providers such as OpenStreetMap (OSM).

In more detail, as indicated herein, the map data may be used for, for example, determining an initial estimated vehicle traffic volume for each of a plurality of road segments along which the plurality of vehicles operate. Thus, the map data may generally include at least road network information identifying road segments in the area within which the plurality of vehicles operate so that the particular road segments along which the plurality of vehicles operate may, in turn, be identified (e.g., using the telematics data). However, as will be described in detail below, an expansion factor determined by the systems and methods of the present disclosure may be for a road segment, a census tract, a county, a state/province, etc. Thus, in some embodiments, the map data may also comprise regulatory data for identifying the bounds of such areas.

The census data, like the map data, is also related to the area within which the plurality of vehicles operate. As will be described herein, the census data may be used for, for example, the generation of estimated vehicle traffic volumes using a machine learning model. In more detail, the census data may at least be input into a machine learning model along with one or more other types of data (e.g., the telematics data) to generate a total estimated vehicle traffic volume for an area. The inventors of the present application surprisingly found that census data may provide contextual information to machine learning models for improving the accuracy of the estimated vehicle traffic volumes generated thereby. The census data may include information such as, but not limited to, comprises income data, population data, gross domestic product (GDP) data, business and firm data, or a combination thereof. For example, the census data may comprise the number of establishments (e.g., businesses and/or firms) in an area, the annual payroll of an area, the first quarterly payroll of an area, the number of employees of establishments in an area, the median housing costs of an area, the per-capita income of an area, the total household income of an area, median and/or mean income of an area, civilian labor force data, employed and/or unemployed population counts of an area, population totals of an area, etc. The census data may be obtained from, for example, a census information provider such as a government census agency.

Referring now to operation 420 of the method 400, an initial estimated vehicle traffic volume for each of a plurality of road segments along which the plurality of vehicles operate may be determined using the telematics data and the map data. As shown, the initial estimated vehicle traffic volume for each of the plurality of road segments may be determined based on an amount of the plurality of vehicles that operate therealong.

In more detail, the plurality of road segments along which the plurality of vehicles operate may be identified using the map data and the telematics data by, for example, comparing geospatial data obtained from the vehicles to the location of each of the plurality of road segments to thereby determine whether a particular road segment has been traversed by a vehicle and, in turn, an amount of the plurality of vehicles that have traversed the particular road segment. The amount of the plurality of vehicles may represent, for example, the number of unique vehicles that have operated along the particular road segment, the number of times a unique vehicle has operated along the particular road segment, etc.

Further, it is noted that a road segment may represent at least a portion of a roadway. Examples of road segments include, but are not limited to, motorways, trunk roads, primary roads, secondary roads, tertiary roads, or any combination thereof.

Using the amount of the plurality of vehicles that operate along a particular road segment, an initial estimated traffic volume may be determined therefor. The initial estimated traffic volume may represent an estimated traffic volume that is based on the telematics data obtained from the plurality of vehicles that are operating along the particular road segment—i.e., a subset of the total vehicle traffic traversing the particular road segment. As will be described herein, the initial estimated traffic volume may be used to determine an estimated traffic volume that is representative of all vehicle traffic traversing the particular road segment—i.e., a total estimated vehicle traffic volume.

The initial estimated traffic volume may be determined for each of the plurality of road segments along which the plurality of vehicles operate using any suitable technique. For example, in some embodiments, the initial estimated traffic volume may be an average annual daily traffic (AADT) for each of the plurality of road segments along which one or more of the plurality of vehicles operate. The AADT for a road segment may be determined using, for example, the following Formula (1).

$$AADT = \frac{1}{n}\sum_{k=1}^{n} VOL_k \qquad \text{Formula (1)}$$

wherein, $VOL_k$ represents a volume of traffic on $k^{th}$ day of the year (e.g., as determined from the telematics data) and n represents the number of days in the year.

As another example, the AADT for a road segment may be determined using the following Formula (2).

$$AADT = \frac{1}{12}\sum_{m=1}^{12}\left[\frac{1}{7}\sum_{j=1}^{7}\left(\frac{1}{n_{jm}}\sum_{i=1}^{n_{jm}} VOL_{ijm}\right)\right] \qquad \text{Formula (2)}$$

wherein, j represents the day of the week, m represents the month of the year, i represents the number of occurrences of day j in month m, $n_{jm}$ represents the number of occurrences of day j in month m, and $VOL_{jm}$ represents the daily traffic volume for the $i^{th}$ occurrence of the $j^{th}$ day of the week with the $m^{th}$ month (e.g., as determined using the telematics data).

Of course, other techniques for determining the initial estimated traffic volume for each of the plurality of road segments along which the plurality of vehicles operate may be used if so desired.

Referring now to operation 430 of the method 400, it is shown that a total estimated vehicle traffic volume for each of the plurality of road segments along which the plurality of vehicles operate may be generated. As described above, the initial estimated vehicle traffic volume may represent an estimated traffic volume that is based on the plurality of vehicles from which the telematics data is obtained—i.e., a subset of the total traffic traversing a given road segment. In contrast, the total estimated vehicle traffic volume may be representative of all vehicle traffic that traverses the given road segment, including vehicles that do not have a telematics device installed therein.

The total estimated vehicle traffic volume for each of the plurality of road segments along which the plurality of vehicles operate may be generated by, for example, inputting into a machine learning model the initial estimated vehicle traffic volume for each thereof and the census data. As described above, the inventors of the present disclosure surprisingly found that census data may be used to provide contextual information to a machine learning model that, when combined with each initial estimated vehicle traffic volume, may allow the machine learning model to accurately generate the total estimated vehicle traffic volume.

As indicated above, the census data may relate to the area within which the plurality of vehicles operate. Thus, the census data may relate to, or include information about, the area within which the plurality of road segments are located. The census data may include information such as, but not limited to, geospatial data, economic data, transportation data, and the like. For example, in some embodiments, the census data may include income data (e.g., data indicating statistics and/or metrics regarding financial income of an area), gross domestic product (GPD) data (e.g., the total value of the goods and services produced within an area), business and firm data (e.g., the number of new business and/or firm registrations in an area), and the like. In a further embodiment, the census data may include information such as, but not limited to, the number of establishments (e.g., businesses and/or firms) in an area, the annual payroll of an area, the first quarterly payroll of an area, the number of employees of establishments in an area, the median housing costs of an area, the per-capita income of an area, the total household income of an area, median and/or mean income of an area, civilian labor force data, employed and/or unemployed population counts of an area, population totals of an area, etc. As described above, such information may provide contextual information to the machine learning model for generating the total estimated vehicle traffic.

In some embodiments, the census data and the telematics data are collected and/or originate from the same calendar year. For example, in such embodiments, the census data and the telematics data may both originate from the year 2023 (i.e., vehicles operating during 2023 and census data for the year 2023).

The type of machine learning model employed for generating of the total estimated vehicle traffic is not particularly limited. Generally, any type of predictive machine learning model may be suitable. For example, the machine learning model may comprise a neural network model, a regression model (e.g., a linear regression model, a logarithmic regression model, etc.), a random forest model, a gradient boosting model (e.g., XGBoost), or a combination thereof. As will be appreciated, the machine learning model may generally be trained to generate a total estimated vehicle traffic volume for a road segment based on an initial estimated vehicle traffic volume therefor and census data related to the area within which the road segment is located.

Each generated total estimated vehicle traffic volume may be formatted as an annual average daily traffic (AADT) metric, as discussed above in relation to the determining of the initial estimated traffic volume, or another format if so desired.

Referring now to operation 440 of the method 400, an expansion factor for each of the plurality of road segments along which the plurality of vehicles operate may be determined. As indicated herein, an expansion factor is a factor that, when applied to a subset of vehicle traffic in an area (e.g., the initial estimated vehicle traffic volume), generates an accurate representation of the total vehicle traffic of that area. The expansion factor of a given road segment may be determined based, at least in part, on a ratio of the initial estimated vehicle traffic volume of that road segment to the total estimated vehicle traffic volume of that road segment.

In some embodiments, the expansion factor of a given road segment may be determined by dividing the total estimated vehicle traffic volume thereof (e.g., as generated by the machine learning model) by the initial vehicle traffic volume (e.g., as determined based on the telematics data obtained from the plurality of vehicles and the map data). In another embodiment, the expansion factor of a given road segment may be determined by applying a linear regression model to the initial estimated vehicle traffic volume thereof and the total estimated traffic volume thereof. In such embodiments, the expansion factor may correspond to a slope of a linear regression generated by the linear regression model.

Once determined, each expansion factor may be applied to an initial estimated traffic volume of the relevant road segment (e.g., as determined based on the telematics data obtained from the plurality of vehicles and the map data) to estimate, for example, the AADT of that road segment.

Further, it may in some cases be useful to determine expansion factors for particular types of users and/or applications. For example, it may be useful to determine expansion factors for certain vehicle types (e.g., commercial traffic), certain road segment types (e.g., limited to motor ways), etc. within a given area. As will be appreciated, such expansion factors may be particularly useful for, for example, logistics companies, infrastructure planning, and the like.

As an example, in some embodiments, the method 400 may further comprise operating the at least one processor (e.g., the processor 112, 132, 152) to determine one or more vehicle-based expansion factors for a selected area, the vehicle-based expansion factors based at least in part on a portion of the census data indicating an amount of commercial traffic present in the selected area. In such embodiments, the vehicle-based expansion factors may represent expansion factors for estimating the traffic volume of a particular vehicle type. In more detail, the determining of the one or more vehicle-based expansion factors may comprise operating the at least one processor to: determine an initial percentage of commercial traffic for one or more of the plurality of road segments located within the selected area based on the initial estimated traffic volume of each thereof and the portion of the census data indicating the amount of commercial traffic present in the selected area; determine a total percentage of commercial traffic for each of the plurality of road segments based on the total estimated traffic volume of each thereof and the portion of the census data indicating the amount of commercial traffic present in the selected area; and determine the one or more vehicle-based expansion factors based on a ratio of the initial percentage of commercial traffic in the selected area to the total percentage of commercial traffic in the selected area.

In such embodiments, the portion of census data that indicates the amount of commercial traffic present in the selected area may be provided by, for example, various government agencies. It is also noted that, depending on the source of the census data, the definition of "commercial vehicle" may differ. For example, some census data providers may define certain classes of trucks as commercial vehicles (e.g., trucks), while others may define commercial vehicles as those owned by businesses. Thus, the particular type of vehicle-based expansion factor may differ based on the census data provider.

As well, it may also in some cases be useful to determine expansion factors at varying levels of granularity (e.g., for selected areas of different sizes). In more detail, many areas include a plurality of road segments (e.g., a road network of road segments), which may in turn yield a plurality of expansion factors. Thus, it may be useful to aggregate the expansion factors of a given area so that, when estimating the traffic volume of the area, fewer expansion factors are required. As well, such techniques may be useful for areas that have one or more road segments located therein for which an expansion factor may not be determined (e.g., a lack of vehicles from which telematics data is obtainable traversing a road segment, a road segment that is not included in the map data, etc.). In more detail, by using an aggregated expansion factor for a given area, vehicle traffic volumes may be estimated for such road segments based, for example, on expansion factors determined for other road segments in the area.

As an example, in some embodiments, the method 400 may further comprise operating the at least one processor (e.g., the processor 112, 132, 152) to determine one or more aggregate expansion factors for a selected area, the one or more aggregate expansion factors based at least in part on a ratio of the initial estimated vehicle traffic volume of one or more of the plurality of road segments located within the selected area to the total estimated vehicle traffic volume of the one or more road segments located within the selected area. In such embodiments, the one or more aggregate expansion factors may be determined by, for example, dividing an average total estimated vehicle traffic volume of the road segments located in the selected area by an average initial estimated vehicle traffic of the road segments in the selected area. As another example, in some embodiments, the determining of the one or more aggregate expansion factors is based at least in part on a ratio of a weighted average of the initial estimated vehicle traffic volume of the one or more of the plurality of road segments located within the selected area divided by the length of each thereof to a weighted average of the total estimated vehicle traffic volume of the one or more road segments located within the selected area divided by the length of each thereof.

Thus, using a plurality of expansion factors (e.g., for a plurality of road segments) within a selected area, an aggregated expansion factor that is applicable to the entire selected area may be determined. Examples of suitable selected areas include, but are not limited to, countries, states, provinces, counties, census tracts, and the like.

In light of the above, the systems and methods of the present disclosure may advantageously not rely on relatively limited traffic monitoring data (e.g., as obtained and distributed at discrete locations) while also being suitable for the determination of expansion factors, and in turn the estimation of vehicle traffic volumes, at varying granularities (e.g., selected areas of varying sizes).

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of or "consist of the various components and steps. Moreover, the indefinite articles "a" or "an," as used in the claims, are defined herein to mean one or more than one of the element that it introduces.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A system for determining an expansion factor for estimating vehicle traffic volume, the system comprising:

at least one data storage operable to store telematics data originating from a plurality of telematics devices installed in a plurality of vehicles, map data and census data related to an area within which the plurality of vehicles operate; and at least one processor, the at least one processor operable to:

determine, using the telematics data and the map data, an initial estimated vehicle traffic volume for each of a plurality of road segments along which the plurality of vehicles operate based on an amount of the plurality of vehicles that operate therealong;

generate a total estimated vehicle traffic volume for each of the plurality of road segments along which the plurality of vehicles operate by inputting into a machine learning model the initial estimated vehicle traffic volume for each thereof and the census data;

determine the expansion factor for each of the plurality of road segments along which the plurality of vehicles operate based at least in part on a ratio of the initial estimated vehicle traffic volume thereof to the total estimated vehicle traffic volume; and determine one or more aggregate expansion factors for a selected area, the one or more aggregate expansion factors based at least in part on a ratio of a weighted average of the initial estimated vehicle traffic volume of the one or more of the plurality of road segments located within the selected area divided by the length of each thereof to a weighted average of the total estimated vehicle traffic volume of the one or more road segments located within the selected area divided by the length of each thereof; and operate at least one of the plurality of telematics devices to communicate with one or more electrical control units that control vehicle components; and control the vehicle components based on the communication between the plurality of telematics devices and the one or more electrical control units.

2. The system of claim 1, wherein the at least one processor is operable to determine the expansion factor for each of the plurality of road segments by applying a linear regression model to the initial estimated vehicle traffic volume and the total estimated traffic volume of each of the plurality of road segments.

3. The system of claim 1, wherein the at least one processor is further operable to determine one or more vehicle-based expansion factors for a selected area, the vehicle-based expansion factors based at least in part on a portion of the census data indicating an amount of commercial traffic present in the selected area.

4. The system of claim 3, wherein the at least one processor is operable to determine the one or more vehicle-based expansion factors by:

determining an initial percentage of commercial traffic for one or more of the plurality of road segments located within the selected area based on the initial estimated traffic volume of each thereof and the portion of the census data indicating the amount of commercial traffic present in the selected area;

determining a total percentage of commercial traffic for each of the plurality of road segments based on the total estimated traffic volume of each thereof and the portion of the census data indicating the amount of commercial traffic present in the selected area; and determining the one or more vehicle-based expansion factors based on a ratio of the initial percentage of commercial traffic in the selected area to the total percentage of commercial traffic in the selected area.

5. The system of claim 1, wherein the census data comprises geospatial data, demographic data, economic data, transportation data, or a combination thereof.

6. The system of claim 5, wherein the census data comprises income data, population data, gross domestic product (GDP) data, business and firm data, or a combination thereof.

7. The system of claim 1, wherein the machine learning model comprises a neural network model, a regression model, a random forest model, a gradient boosting model, or a combination thereof.

8. A method for determining an expansion factor for estimating vehicle traffic volume, the method comprising operating at least one processor to:

receive telematics data originating from a plurality of telematics devices installed in a plurality of vehicles, map data and census data related to an area within which the plurality of vehicles operate;

determine, using the telematics data and the map data, an initial estimated vehicle traffic volume for each of a plurality of road segments along which the plurality of vehicles operate based on an amount of the plurality of vehicles that operate therealong;

generate a total estimated vehicle traffic volume for each of the plurality of road segments along which the plurality of vehicles operate by inputting into a machine learning model the initial estimated vehicle traffic volume for each thereof and the census data;

determine the expansion factor for each of the plurality of road segments along which the plurality of vehicles operate based at least in part on a ratio of the initial estimated vehicle traffic volume thereof to the total estimated vehicle traffic volume; and determine one or more aggregate expansion factors for a selected area, the one or more aggregate expansion factors based at least in part on a ratio of a weighted average of the initial estimated vehicle traffic volume of the one or more of the plurality of road segments located within the selected area divided by the length of each thereof to a weighted average of the total estimated vehicle traffic volume of the one or more road segments located within the selected area divided by the length of each thereof; and operate at least one of the plurality of telematics devices to communicate with one or more electrical control units that control vehicle components; and control the vehicle components based on the communication between the plurality of telematics devices and the one or more electrical control units.

9. The method of claim 8, wherein the determining of the expansion factor for each of the plurality of road segments comprises operating the at least one processor to apply a linear regression model to the initial estimated vehicle traffic volume and the total estimated traffic volume of each of the plurality of road segments.

10. The method of claim 8, further comprising operating the at least one processor to determine one or more vehicle-based expansion factors for a selected area, the vehicle-based expansion factors based at least in part on a portion of the census data indicating an amount of commercial traffic present in the selected area.

11. The method of claim 10, wherein the determining of the one or more vehicle-based expansion factors comprises operating the at least one processor to:

determine an initial percentage of commercial traffic for one or more of the plurality of road segments located within the selected area based on the initial estimated traffic volume of each thereof and the portion of the census data indicating the amount of commercial traffic present in the selected area;

determine a total percentage of commercial traffic for each of the plurality of road segments based on the total estimated traffic volume of each thereof and the portion of the census data indicating the amount of commercial traffic present in the selected area; and determine the one or more vehicle-based expansion factors based on a ratio of the initial percentage of commercial traffic in the selected area to the total percentage of commercial traffic in the selected area.

12. The method of claim 8, wherein the census data comprises geospatial data, demographic data, economic data, transportation data, or a combination thereof.

13. The method of claim 12, wherein the census data comprises income data, population data, gross domestic product (GDP) data, business and firm data, or a combination thereof.

14. The method of claim 8, wherein the machine learning model comprises a neural network model, a regression model, a random forest model, a gradient boosting model, or a combination thereof.

15. A non-transitory computer-readable medium having instructions stored thereon executable by at least one processor to implement a method comprising operating the at least one processor to:

receive telematics data originating from a plurality of telematics devices installed in a plurality of vehicles, map data and census data related to an area within which the plurality of vehicles operate;

determine, using the telematics data and the map data, an initial estimated vehicle traffic volume for each of a plurality of road segments along which the plurality of vehicles operate based on an amount of the plurality of vehicles that operate therealong;

generate a total estimated vehicle traffic volume for each of the plurality of road segments along which the plurality of vehicles operate by inputting into a machine learning model the initial estimated vehicle traffic volume for each thereof and the census data;

determine the expansion factor for each of the plurality of road segments along which the plurality of vehicles operate based at least in part on a ratio of the initial estimated vehicle traffic volume thereof to the total estimated vehicle traffic volume; and determine one or more aggregate expansion factors for a selected area, the one or more aggregate expansion factors based at least in part on a ratio of a weighted average of the initial estimated vehicle traffic volume of the one or more of the plurality of road segments located within the selected area divided by the length of each thereof to a weighted average of the total estimated vehicle traffic volume of the one or more road segments located within the selected area divided by the length of each thereof; and operate at least one of the plurality of telematics devices to communicate with one or more electrical control units that control vehicle components; and control the vehicle components based on the communication between the plurality of telematics devices and the one or more electrical control units.

* * * * *